(12) United States Patent
Ryder et al.

(10) Patent No.: US 8,028,759 B2
(45) Date of Patent: *Oct. 4, 2011

(54) PRESCISION HOE OPENER WITH SWING LINK BETWEEN CYLINDER AND SHANK

(75) Inventors: Nicholas George Alfred Ryder, Saskatoon (CA); Montgomerie Summach, Saskatoon (CA); Gerard James Gadzella, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/959,888

(22) Filed: Dec. 3, 2010

(65) Prior Publication Data

US 2011/0072663 A1 Mar. 31, 2011

Related U.S. Application Data

(62) Division of application No. 12/141,891, filed on Jun. 18, 2008, now Pat. No. 7,866,410.

(60) Provisional application No. 60/944,790, filed on Jun. 18, 2007.

(51) Int. Cl.
*A01B 49/04* (2006.01)
*A01B 61/04* (2006.01)
*A01B 63/111* (2006.01)
*A01C 5/00* (2006.01)
*A01C 13/00* (2006.01)

(52) U.S. Cl. ............ 172/239; 172/260.5; 172/395; 172/407; 172/417; 172/423; 172/424; 172/663; 172/675; 172/4; 111/135; 111/926

(58) Field of Classification Search .......... 172/407, 172/395, 239, 413, 4, 260.5, 417, 448, 423, 172/424, 427, 663, 675; 111/926, 62, 134, 111/135; 29/891
See application file for complete search history.

(56) References Cited

U.S. PATENT DOCUMENTS

| | | |
|---|---|---|
| 2,818,269 A | 12/1957 | Northcote et al. |
| 4,326,594 A | 4/1982 | Oka et al. |
| 4,694,759 A | 9/1987 | Drever et al. |
| 4,721,048 A | 1/1988 | Fuss et al. |
| 4,759,301 A | 7/1988 | Thomas |
| 5,396,851 A | 3/1995 | Beaujot |
| 5,727,638 A | 3/1998 | Wodrich et al. |
| 5,855,245 A | 1/1999 | Gerein |
| 6,032,593 A | 3/2000 | Wendling et al. |
| 7,104,205 B2 | 9/2006 | Beaujot |
| 7,152,539 B2 | 12/2006 | Swanson |
| 7,168,376 B2 | 1/2007 | Johnston |
| 7,261,048 B1 | 8/2007 | Hantke |
| 2004/0159271 A1 | 8/2004 | Beaujot |
| 2007/0245938 A1 | 10/2007 | Bourgault et al. |
| 2008/0029002 A1 | 2/2008 | Sulman |

*Primary Examiner* — Christopher J. Novosad
(74) *Attorney, Agent, or Firm* — Rebecca Henkel; Sue Watson

(57) ABSTRACT

A precision hoe opener assembly is provided with improved accuracy of seeding as well as improved control over the opener and packer wheel assemblies. The opener assembly includes a hydraulically-driven parallel linkage assembly, a lost motion linkage, a hoe opener, and a packer wheel. The design provides improved seeding accuracy, by adjusting assembly components to and compensating for changes in terrain elevation.

4 Claims, 11 Drawing Sheets

PRECISION HOE OPENER WITH SWING LINK BETWEEN CYLINDER AND SHANK

RELATED APPLICATION

This application is a divisional of U.S. patent application Ser. No. 12/141,891, entitled "Precision Hoe Opener Assembly with Swing Link Between Cylinder and Shank," filed Jun. 18, 2008 now U.S. Pat. No. 7,866,410, which is hereby incorporated by reference in its entirety, which benefits from the priority of U.S. Provisional Patent Application No. 60/944,790, entitled "Precision Hoe Opener Assembly with Swing Link and Biasing Member," filed Jun. 18, 2007, which is hereby incorporated by reference in its entirety.

BACKGROUND

The invention relates to agricultural seeders, such as hoe openers and seeding tools used in farming operations to distribute seeds into the soil.

Generally, precision hoe openers are mounted to the frame of an implement which is towed behind a tractor. These openers may include a ground engaging tool that opens the soil, providing a path for seed deposition into the soil. After the seed is deposited, the ground engaging tool may be followed by a packer wheel that packs the soil on top of the deposited seed. The packer wheel may be rigidly mounted behind the ground engaging tool via a structural member or rear frame. Thus, the ground engaging tool and packer wheel generally move together with the same upward and downward motion. This vertical motion, somewhat independent of the implement frame, allows for more precise placement of seed in the soil.

Unfortunately, existing precision hoe openers do not adequately address the need for height variation over terrain during seeding, or for transportation when not seeding. It is generally undesirable to pull the hoe opener through soil when merely transporting the opener from one location to another. In addition, during seeding, existing openers do not provide adequate vertical motion of the opener and related assembly without compromising the load on the ground engaging tool and packer wheel. As a result, variations in the terrain can result in drastic changes in the packing force of the packer wheel on the terrain being seeded by the opener and, also, the draft force of the terrain on the ground engaging tool. In turn, this variation in ground opening force and packing force can result in non-uniform seeding depths and packing density in the terrain being seeded.

The distance between the packer wheel and ground engaging tool can also affect the seeding accuracy of the opener apparatus. Existing precision hoe openers have a fixed distance between the packer wheel and ground engaging tool. A greater distance between the components will cause variations in the terrain to affect the force on the opener or packer wheel to an even greater degree. This will also result in non-uniform force applied to the soil by the two components, which reduces seeding accuracy.

Existing precision hoe openers also require substantial force to raise the opener assembly, including the ground engaging assembly and packer wheel. This requirement results in the use of large hydraulic cylinders to raise the apparatus, due to the overall length and weight of each opener assembly. This hydraulic equipment is costly and is demanding of resources (i.e., hydraulic power) from other portions of the tractor and seeding implement.

There is a need, therefore, for improved arrangements in precision hoe openers that improve the accuracy of the seeding operation. There is a particular need for a precision hoe opener configuration that applies forces to the ground engaging tool and the packing wheel to improve seeding depth and accuracy.

BRIEF DESCRIPTION

It should be understood that the following discussion, and specific embodiments, are presented merely to provide the reader with a brief summary of certain forms the invention might take and that these embodiments are not intended to limit the scope of the invention. Indeed, the invention may encompass a variety of aspects that may not be set forth below.

Embodiments of the present invention address the problem of inadequate vertical motion of the tool by optimizing the geometric relationship of the cylinder, parallel linkage, ground engaging tool, and packer wheel. Specifically, embodiments of the present invention allow for additional motion between the shank and cylinder by incorporating a swing link assembly between these elements. The swing link enables the cylinder to travel farther than if it were rigidly mounted to the shank, providing for alternative positions as the cylinder is extended or retracted. These alternative positions allow for both additional vertical motion of the assembly and the desired loading on the opener and packer wheel.

Embodiments of the present invention include draft compensation in the parallel linkage to counteract draft forces placed on the ground engaging tool during operation. One of the difficulties is that at any point where the linkage is not parallel with the ground, force at the packer wheel will fluctuate as the draft force applied to the ground engaging tool varies. Embodiments of the present invention are configured to enable the hydraulic load of the cylinder to compensate and counteract the varying draft loads on the opener, thereby maintaining a substantially constant packing pressure on the packer wheel.

Various refinements exist of the features noted above in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to subject matter set forth in claims.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
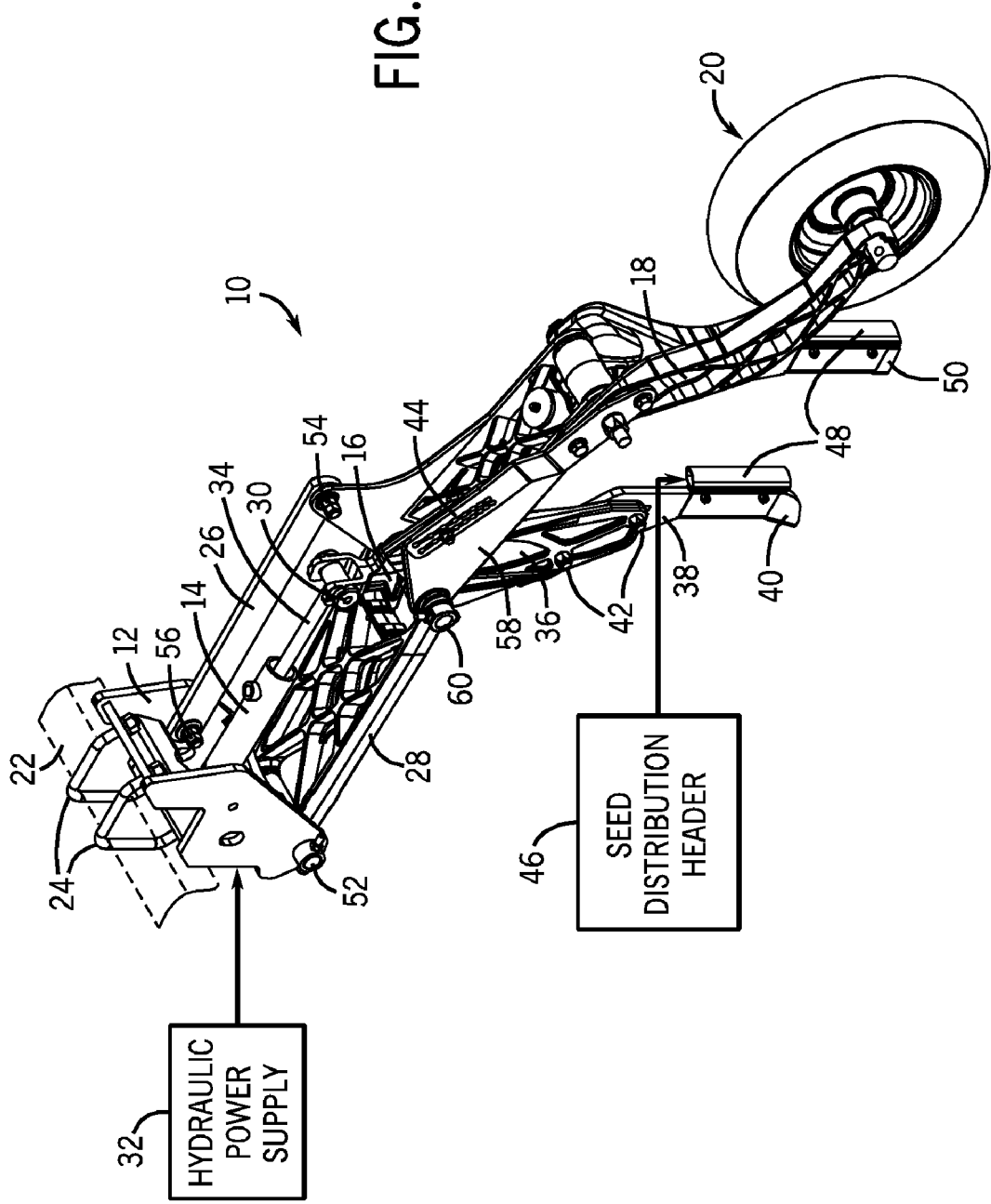
FIG. 1 is a perspective view of an embodiment of a precision hoe opener having a frame support, a cylinder, a swing link assembly, a rear frame assembly, a ground engaging tool, and a packer wheel.

Turning now to the drawings and referring first to FIG. 1, an embodiment of a precision hoe opener assembly is illustrated and designated generally by reference numeral 10. Precision opener assembly 10 includes a frame support 12, an actuator or drive such as a cylinder 14 (e.g., hydraulic and/or pneumatic piston-cylinder assembly), a swing link assembly 16, a packer wheel assembly 18 (e.g., packer arm), and a packer wheel 20. Precision hoe opener assembly 10 may be towed, pushed, or generally moved by a vehicle, such as a tractor (not shown). For example, the frame support 12 may interface tool frame tow bar 22 attached to the tractor for towing the precision hoe opener assembly 10. The precision hoe opener assembly 10 is mounted to the tractor support via mounting brackets 24. In the present context, the precision hoe opener assembly 10 may also be generally referred to as an opener assembly, a hoe opener, a row unit, a seeder, a planter, an opener or a ground engaging tool/assembly. Further, the ground engaging tool or opener is the portion of the hoe opener assembly that contacts the ground, thereby preparing the soil for seed deposition.

Tool frame support 12 is connected to the swing assembly 16 and packer wheel assembly 18 via the cylinder 14, first member 26, and second member 28. The mounting configuration of cylinder 14, first member 26, and second member 28 will be discussed further below. Elements 12, 26, 28 and 58 collectively form a hydraulically driven parallel linkage assembly. As depicted, cylinder 14 is drives the parallel linkage assembly. Cylinder 14 is mounted to swing link assembly 16 via pin 30. Cylinder 14 is hydraulically coupled to a power supply 32 that may be used to pressurize piston rod 34 to actuate the swing link assembly 16. Once actuated, swing link assembly 16 may engage packer wheel assembly 18 via a stop as will be described further below.

The swing link assembly 16 engages the packer wheel assembly 18 via a shank mount adapter 36. The shank mount adapter 36 is coupled to shank 38 and first opener 40. Shank mount adapter 36 may be coupled to shank 38 via fasteners 42, which allow height adjustments for opener 40 relative to opener assembly 10 and optional second opener 50. Packer wheel assembly adjustments may be made via adjuster 44. First opener 40 is coupled to a seed distribution header 46 via a seeding tube 48 to allow product deposition during operation. As depicted, a seed is the product being deposited in the terrain. The present embodiment illustrates an optional second opener 50, which may be added in some cases to allow for a second product to be placed in the ground. The adjustments enabled by fasteners 42 and adjuster 44 may optimize product placement accuracy by allowing packer wheel 20 to move vertically with respect to first opener 40 and second opener 50. Moreover, the optional second ground engaging tool may affect the packing forces and/or compensation of the system, but would likely not significantly affect the basic design of the precision hoe opener assembly and swing link mechanism.

The diagram also shows first member 26 attached via pins 54 and 56 to tool frame support 12, rear frame 58, and packer wheel assembly 18. Second member 28 is also connected to rear frame 58 and tool frame support 12 via pins 60 and 52. Further, pins 60 and 54 couple rear frame 58 to the packer wheel assembly 18 and shank mount adapter 36 as well as to second member 28. The members 26 and 28 with frame support 12 and rear frame 58 form a second parallel linkage assembly.

As discussed above, cylinder 14 actuates swing link assembly 16 to load shank 38, which further loads packer wheel assembly 18 and packer wheel 20. In certain embodiments, the packer wheel 20 provides a substantially constant force to the soil after the seed product has been deposited. Packer wheel 20 is coupled to packer wheel assembly 18 via a rotating bearing assembly. Further, packer wheel assembly 18 includes multiple mounting locations on adjuster 44 to allow for a positional adjustment of the packer wheel 20. As stated above, seeding accuracy may be enhanced by adjusting the position of packer wheel 20.

Figure 2:
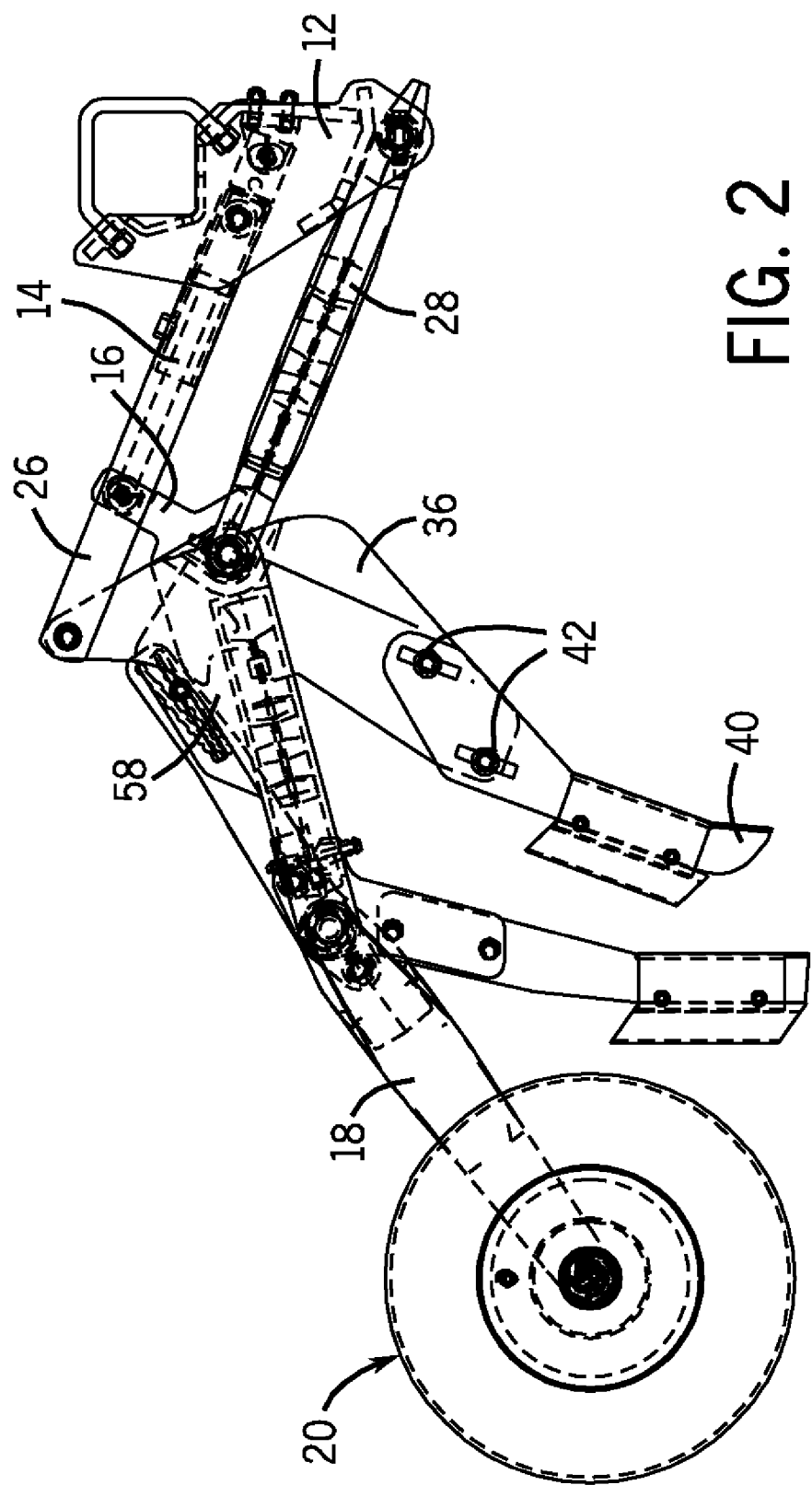
FIG. 2 is a side view of an embodiment of the precision hoe opener of FIG. 1.

FIG. 2 illustrates a side view of an embodiment of the precision hoe opener 10. The figure illustrates the precision hoe opener 10 in the deployed position with first opener 40 in an elevated position as compared to packer wheel 20. In the illustrated embodiment, cylinder 14 causes swing link assembly 16 to rotate about pin 60 and to engage shank mount adapter 36, while a obstacle may cause first opener 40 to be raised above the plane of packer wheel 20 and second opener 50.

Figure 3:
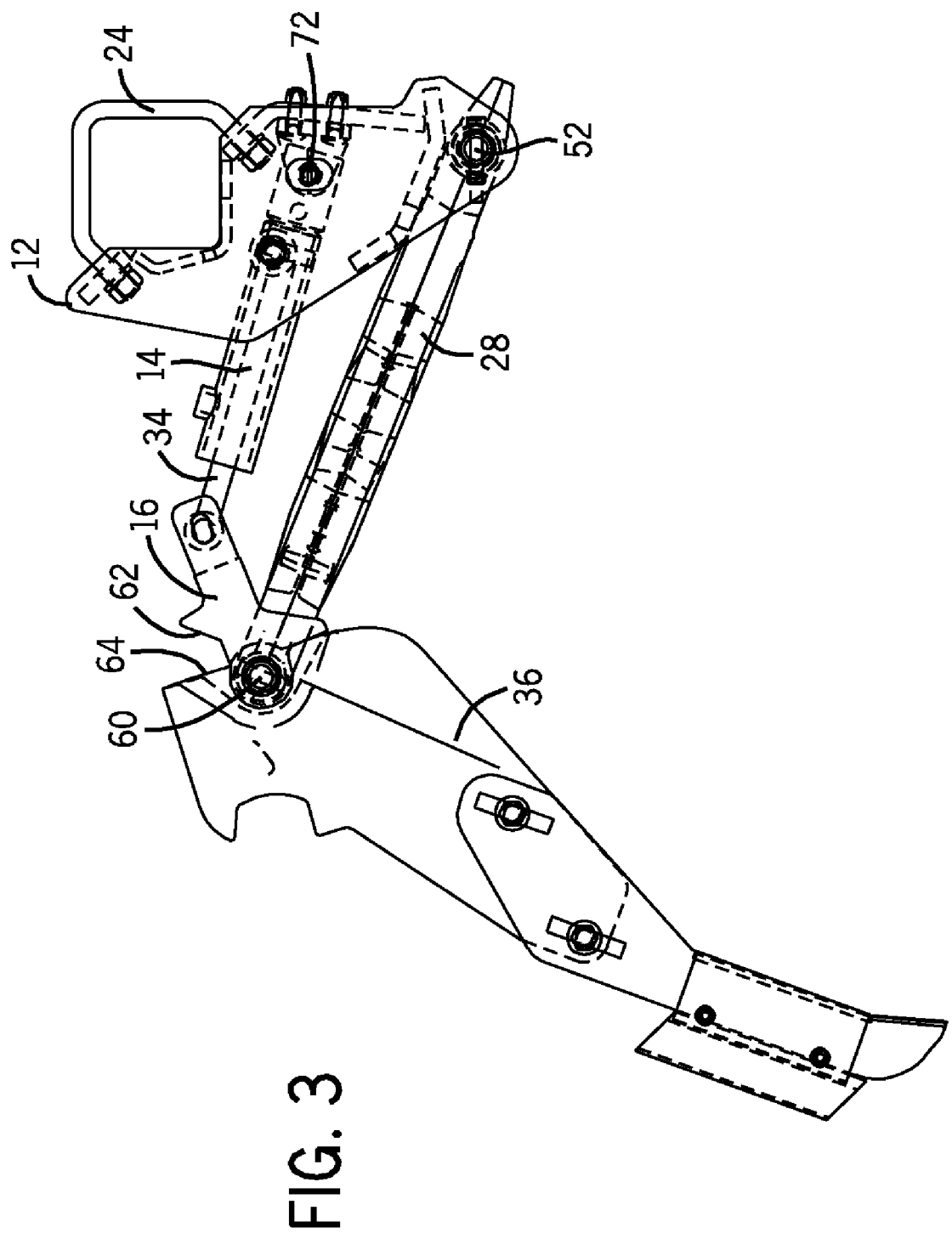
FIG. 3 is a sectional view of an embodiment of the opener assembly of FIGS. 1 and 2, wherein the packer wheel, the rear frame assembly, and certain elements are removed to enhance clarity.

FIG. 3 illustrates a portion of the precision hoe opener 10 with certain features removed for clarity, such as packer wheel 20, packer wheel assembly 18, and first member 26. The figure illustrates the tool frame support 12, cylinder 14, second member 28, swing link assembly 16, and shank mount adapter 36. Further, FIG. 4 is a perspective view of the shank mount adapter 36, swing link assembly 16, and their related elements.

Figure 4:
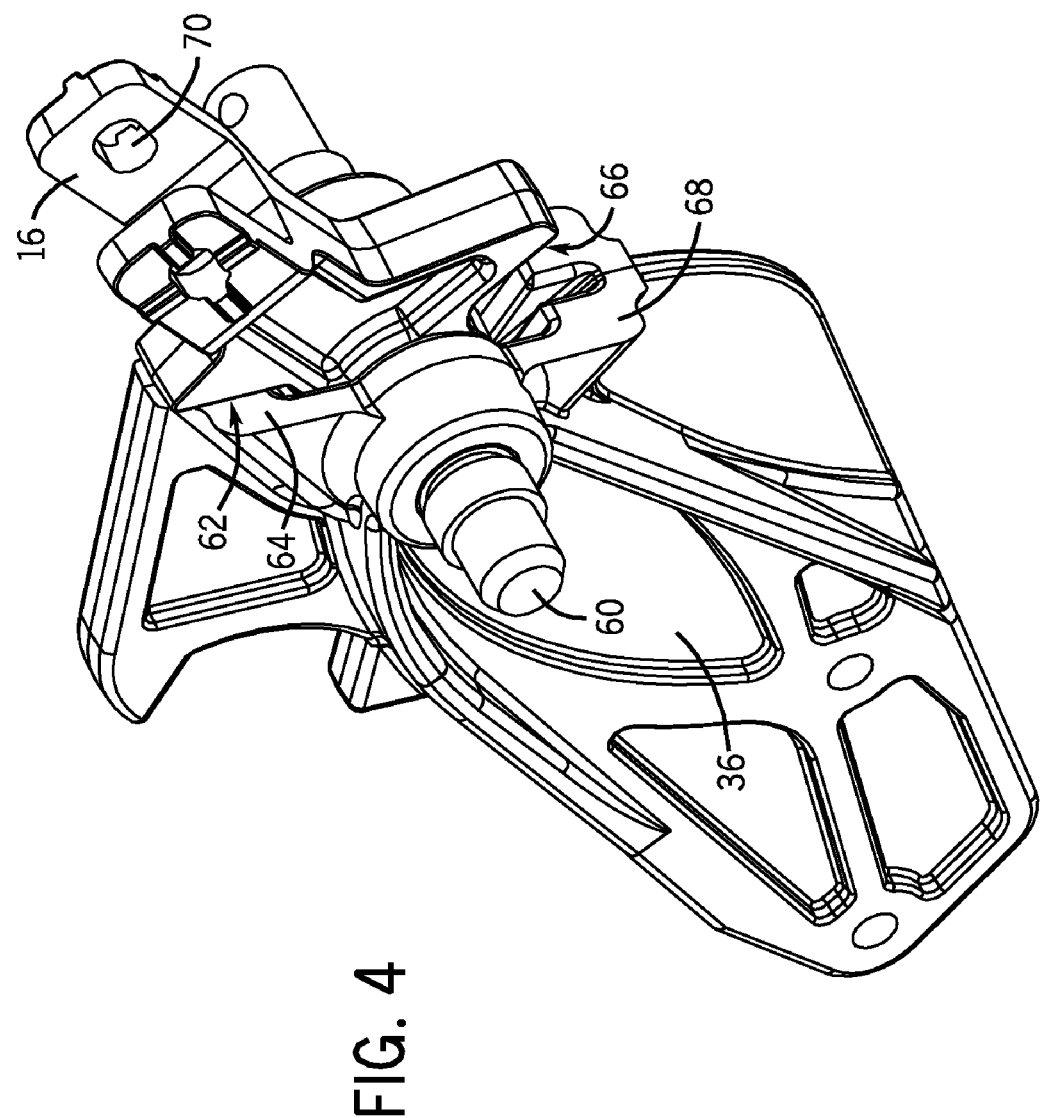
FIG. 4 is a perspective view of an embodiment of the shank mount adapter, the swing link assembly, and associated features shown FIG. 3.

Referring to both FIGS. 3 and 4, shank mount adapter 36 includes a main body having a number of features. These features interface the swing link assembly 16 to the shank mount adapter 36 during either retraction or extension of the cylinder 14. The swing link assembly includes extension mating feature 62 that interfaces with extension contact surface 64 as well as retraction feature 66 and surface 68. These features provide greater leverage about pin 60 for cylinder 14, reducing the amount of hydraulic power needed to move the opener assembly. Hole 70 provides a mounting location for the end of piston rod 34 in the swing link assembly. Pin 72 is provided for the opposite end of the cylinder 14 to mount to tool frame support 12. The swing link assembly 16 may be described as contacting the surfaces of shank mount adapter 36 at the extremities of the angular rotational movement of the swing link assembly 16.

As will be appreciated by one skilled in the art, a portion of the angular movement of the swing link assembly 16 will not cause movement of shank adapter 36 and first opener 40. This characteristic may cause the swing link assembly 16 to be referred to a lost motion linkage.

FIG. 4 shows the swing link assembly 16 in the extended position to engage the shank mount adapter 36, extending the first opener 40 and packer wheel assembly 18 generally downward. In this position, extension mating feature 62 engages extension contact surface 64. In the present embodiment, the geometry of swing link assembly 16 reduces the required length for members 26 and 28 necessary to raise and lower opener assembly 10.

Referring back to FIG. 3, the swing link assembly 16 is shown in the retracted or transport position, e.g., the first opener 40 is lifted higher than the packer wheel 20. In the illustrated retracted position, retraction mating feature 66 engages retraction contact surface 68. As shown in both FIGS. 3 and 4, the cylinder 14 and piston rod 34 are not directly coupled to shank mount adapter 36. Instead, the first opener 40 is retracted and extended via the swing link assembly 16 engaging and disengaging the shank mount adapter 36.

Figure 5:
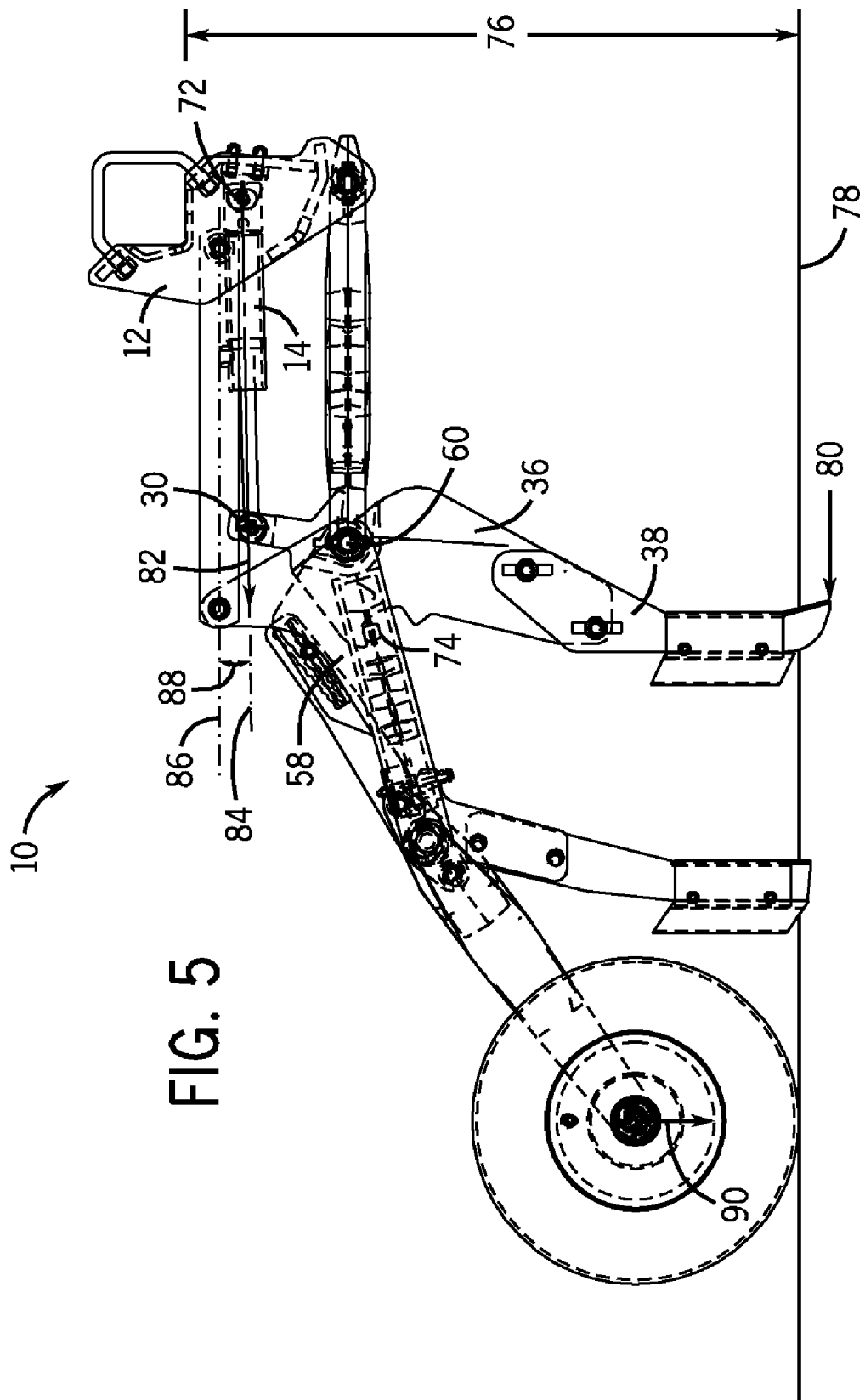
FIG. 5 is a side elevational view of an embodiment of the precision hoe opener as illustrated in FIG. 1, further illustrating a neutral or horizontal operating position to illustrate draft compensation when the assembly is in this operating position.

FIG. 5 illustrates an embodiment of the precision hoe opener 10 in a neutral position as might be representative of being towed during a seeding operation on level ground. In this deployed position for the seeder, shank mount adapter 36 rotates about pin 60 to lower first opener 40 and engage frame stop 74 located on rear frame 58. When shank mount adapter 36 rotates about pin 60 and a cavity located on the adapter engages the top surface of the frame stop 74, shank mount adapter 36 loads packer wheel assembly 18 which is coupled to rear frame 58. The resulting force applies a load to packer wheel 20 via the multiple linkage assembly. Further, when in the extension position, as shown in FIG. 4, frame stop cavity rotates as well, engaging frame stop 74, to provide a lowering force upon the packer wheel assembly. It follows, that when the swing link assembly 16 is in a retraction position, as shown in FIG. 3, the frame stop 74 may provide a lifting force to the packer wheel assembly with contact on the bottom face.

Further, tool frame support 12 is a distance 76 from terrain 78. During normal operation, first opener 40 may plow through terrain 78 creating a draft force 80 on first opener 40. In this position, cylinder load 82 is directed along cylinder axis 84. Linkage axis 86 runs through the center of parallel linkage member 28. Reference numeral 88 represents the small angle between cylinder axis 84 and linkage axis 86. The normal load on packer wheel 20, generally represented by numeral 90, may mainly consist of the weight of opener 10 with a nominal contribution by cylinder load 82. Hydraulic cylinder 14 serves primarily to keep first opener 40 in a deployed position and is connected to the assembly by pins 72 and 30.

Figure 6:
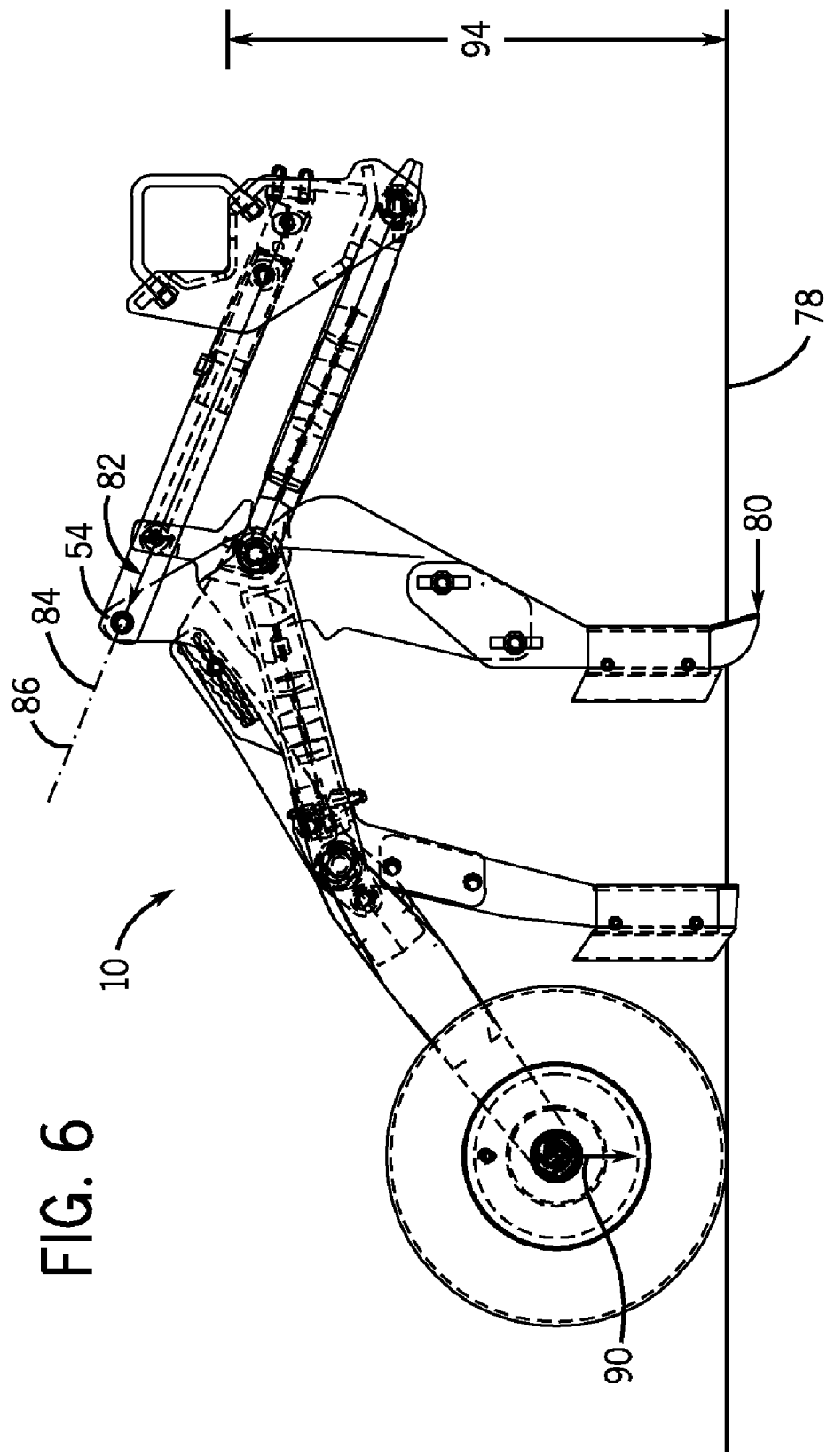
FIG. 6 is a side elevational view of an embodiment of the precision hoe opener as illustrated in FIG. 1, further illustrating a second operating position with the draft compensation loading provided by the cylinder to the packer wheel when the assembly is in this operating position.

FIG. 6 illustrates an embodiment of the precision hoe opener 10 in a second deployed position. In this position, the relative distance between tool frame support 12 and terrain 78 has decreased from that of FIG. 5 and is represented by numeral 94. This decrease in the distance typically occurs during terrain changes. The terrain provides draft force 80 on first opener 40, thereby increasing the packing force 90 of the packer wheel 20 on the terrain 78 due to the orientation of the links 26 and 28 relative to the direction of the application of the draft force. In the illustrated embodiment, cylinder 14 may provide a lifting force to counteract the increased packing force 90 on the packer wheel 20 due to a decrease in angle 88. Cylinder load 82 produces a resultant force in the opposite direction of packing force 90, thereby compensating for a portion of the downward force created by the draft force 80 on first opener 40.

Figure 7:
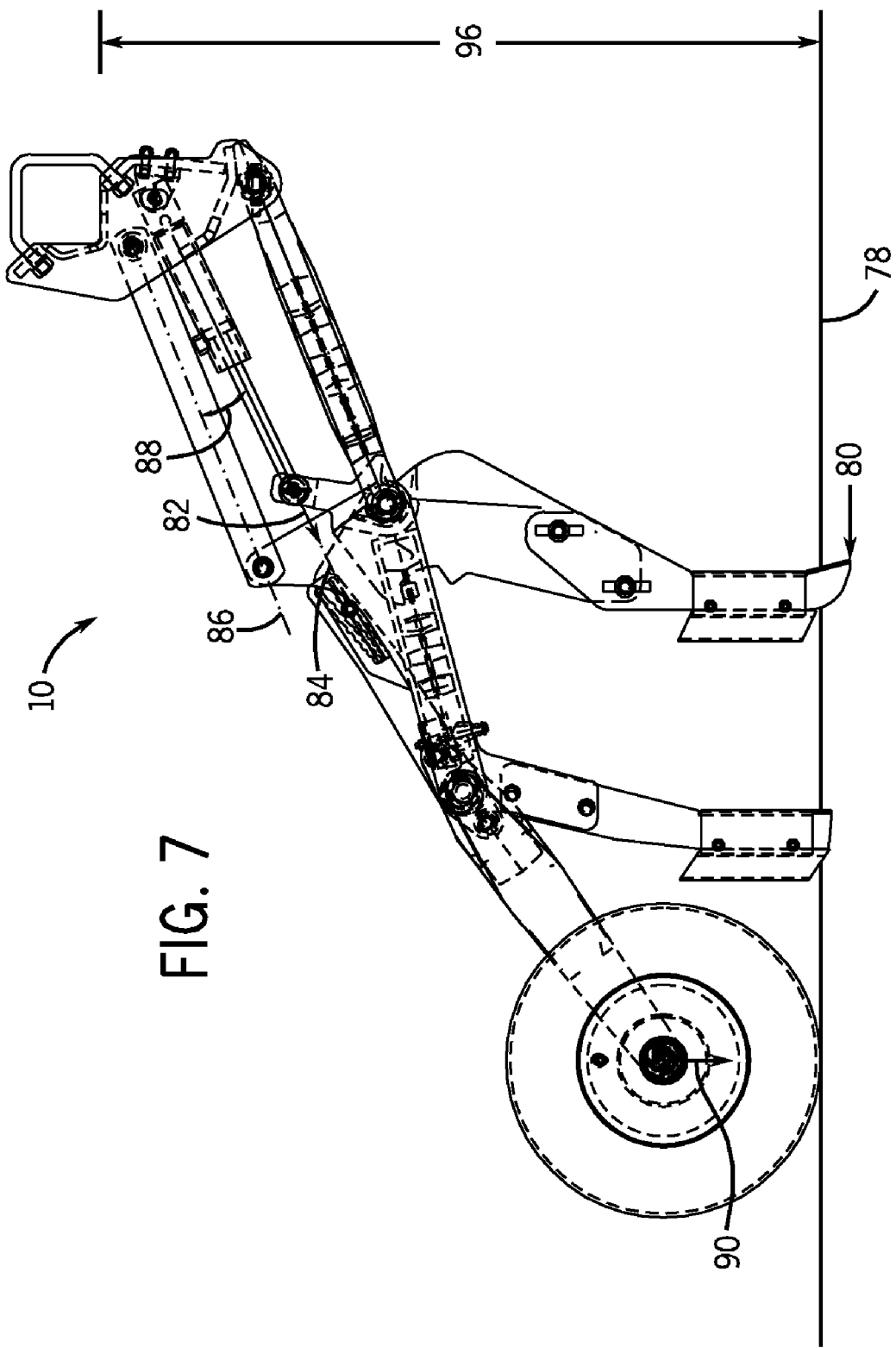
FIG. 7 is a side elevational view of an embodiment of the precision hoe opener as illustrated in FIG. 1, further illustrating a third operating position to illustrate the draft compensation loading provided by the cylinder to the packer wheel when the assembly is in this operating position.

FIG. 7 illustrates an embodiment of the precision hoe opener 10 in a third deployed position. In this illustration, relative distance 96 between tool frame support 12 and terrain 78 has increased relative to FIGS. 5 and 6. As discussed above, this increase may be dependent on the terrain in the field. In this illustration, the relative increase in the distance between tow bar 22 and terrain 78 causes draft force 80 to reduce the packer force 90 on the packer wheel 20 due to the orientation of links 26 and 28 relative to the direction of the draft force 80. The upward resultant force on the opener assembly 10 decreases the packing force 90 exerted on terrain 78. Optimally, it is desirable to maintain a constant packing force 90 by the packer wheel 20 on the terrain 78 to ensure accurate and consistent seeding. As illustrated by the figure, when the relative distance increases, the piston load 82 may act along cylinder axis 84 and the relative angle 88 increases which in turn increases the contribution of the piston load to the packing force 90, on the packer wheel 20. In other words, the cylinder 14 compensates for the decrease in packing force created by draft force 80.

In general, FIGS. 5, 6, and 7 illustrate that the precision opener assembly 10 has an increased range of motion while providing a generally constant packing force to the soil. This is achieved in part by the opener assembly 10 maintaining a substantially constant angle between packer wheel assembly 18 and terrain 78, as well as the geometry of cylinder 14, first member 26, and second member 28.

As appreciated by one in the art, the disclosed embodiments of precision opener 10 provide control of the packing force 90 and the seeding depth of the first opener 40. The opener 10 advantageously responds to variations in the terrain 78, the draft force 80 on the first opener 40, the packing force 90, or a combination thereof. Thus, the opener 10 can provide a generally uniform packing force 90 and seeding depth to improve the overall quality of the seeding process, and in turn improve subsequent growth originating from the seeds. Again, the hoe opener 10 has a variety of adjustment mechanisms to control the location of the packer wheel 20, the first opener 40, the optional second opener 50, or a combination thereof.

Figure 8:
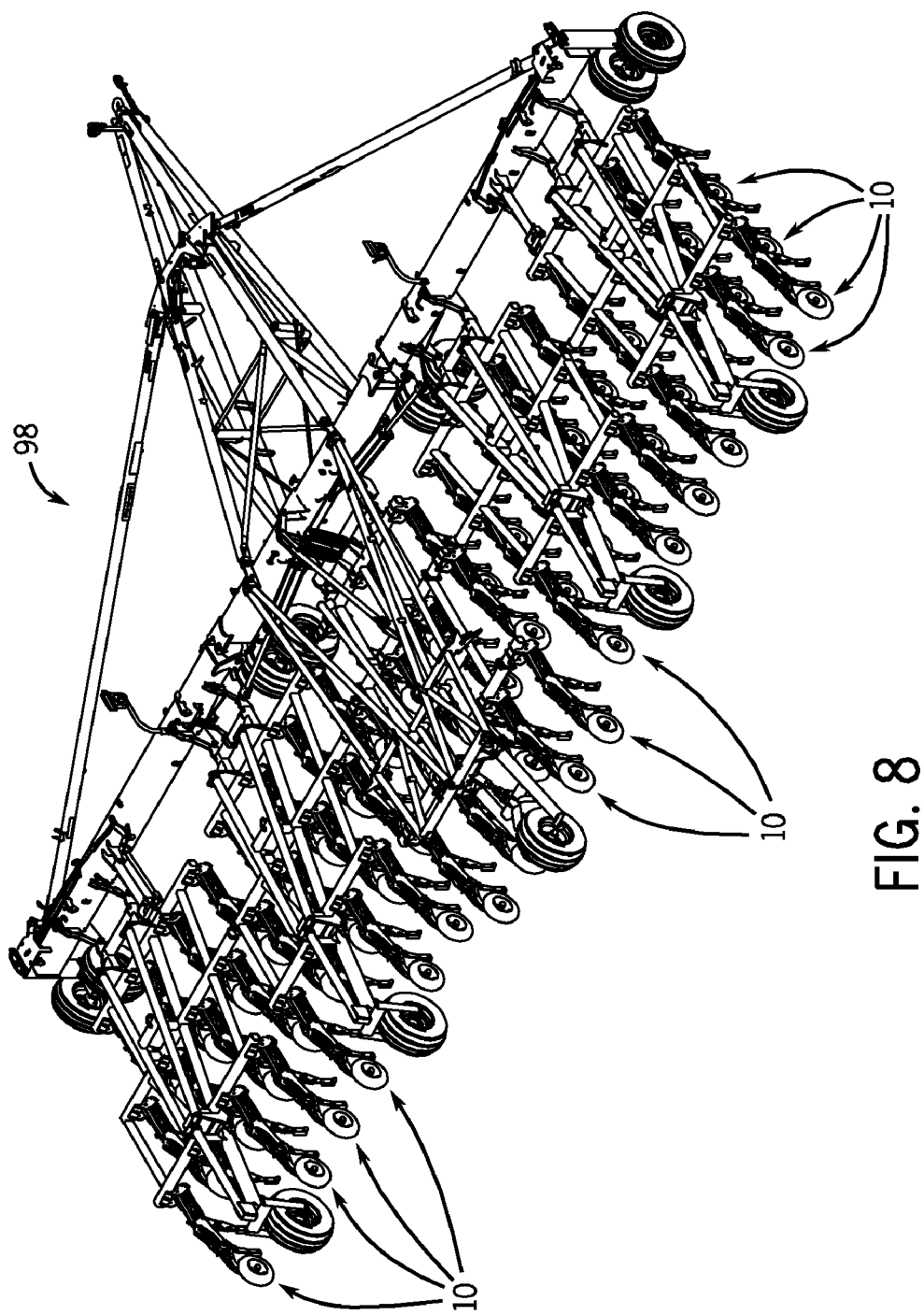
FIG. 8 is a perspective view of an entire precision hoe drill assembly system, including multiple opener assemblies and the implement frame that they are attached thereto.

FIG. 8 illustrates the implement assembly, including precision opener assemblies 10, as row units of a complete agricultural seeding system 98, as may be towed behind a tractor (not shown).

Figure 9:
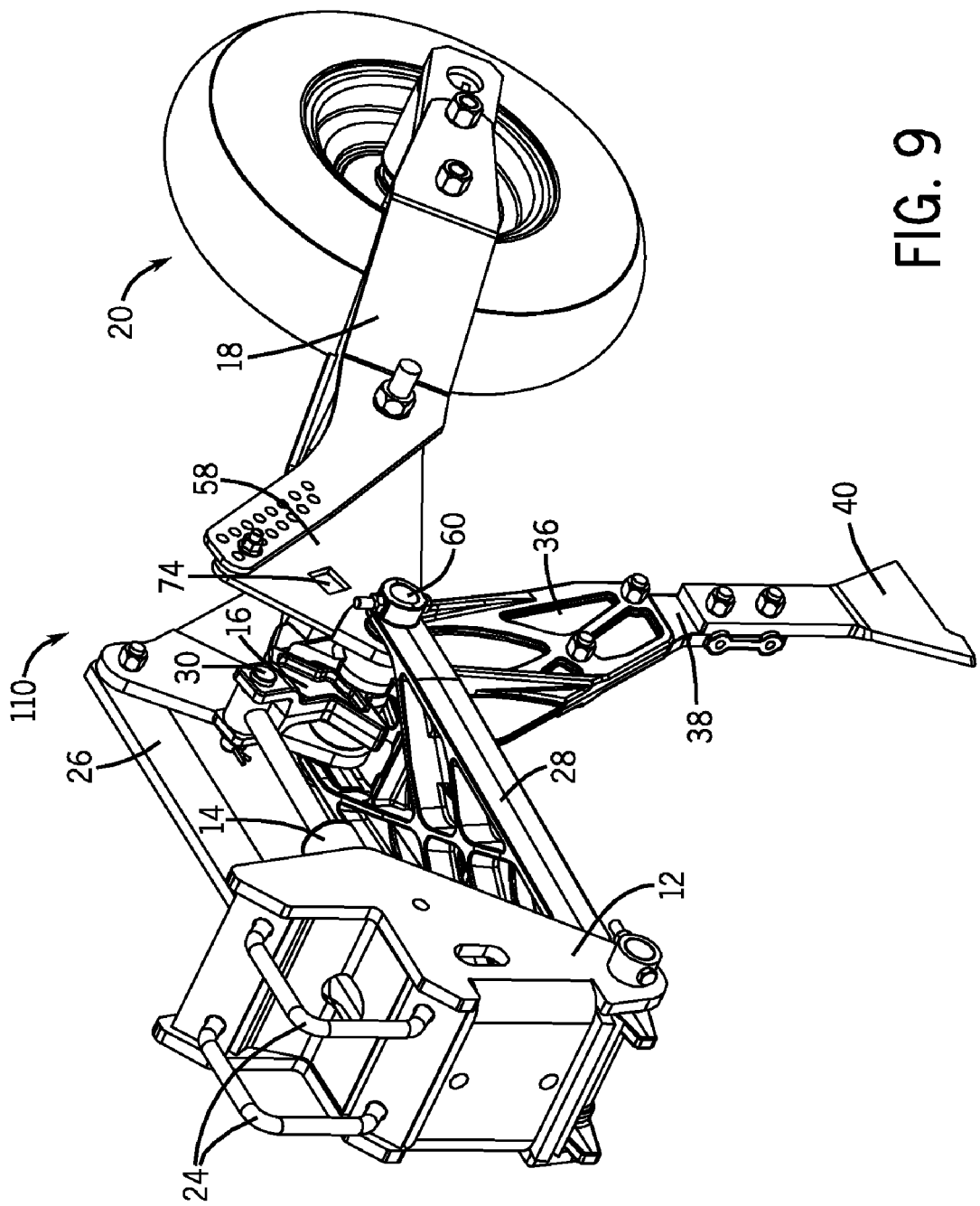
FIG. 9 is a perspective view of another embodiment of a precision hoe opener having a frame support, a cylinder, a swing link assembly, a rear frame assembly, a ground engaging tool, and a packer wheel.

FIG. 9 illustrates an embodiment of precision hoe opener 110 featuring a single ground penetrating tool 40, shank 38, and shank mount adapter 36. Precision hoe opener assembly 110 includes a tool frame support 12, which may interface with a tow bar (not pictured) located on an implement assembly. The precision hoe opener assembly 110 may be mounted to the tow bar via mounting brackets 24.

Tool frame support 12 is connected to swing link assembly 16 and rear frame 58 via an actuator, in the form of hydraulic cylinder 14, and a parallel linkage arrangement formed by first member 26, and second member 28. Cylinder 14 is hydraulically coupled to a power supply (not pictured) that may be used to actuate the swing link assembly 16. Once actuated, swing link assembly 16 may engage packer wheel assembly 18 via stop 74 contacting shank mount adapter 36. The shank mount adapter 36 is rigidly coupled to shank 38 and ground engaging tool 40. This embodiment may also feature a seeding and/or fertilizing apparatus (not pictured)

behind tool 40 to deposit seeds, fertilizer, and so forth into the opened soil. The arrangement may optimize seeding accuracy by adjusting the position of packer wheel 20 relative to ground engaging tool 40. Further, the arrangement allows packer wheel 20 to provide a substantially constant force to the soil after the seed and/or fertilizer have been deposited.

In the illustrated embodiment, first member 26 attached via pins to tool frame support 12, and rear frame 58. Second member 28 may also be connected to rear frame 58 and tool frame support 12 via pins. Members 26 and 28, with frame support 12 and rear frame 58, form the parallel linkage assembly that maintains the orientation of the packer wheel assembly 18 with respect to the ground. The parallel linkage may be used to control the forces on ground engaging tool 40 and packer wheel 20 as the precision hoe opener 110 is towed across the terrain. In the illustrated embodiment, the arrangement allows cylinder 14 to actuate swing link assembly 16, loading shank adapter 36 and ground engaging tool 40, which further loads packer wheel assembly 18 and packer wheel 20.

Figure 10:
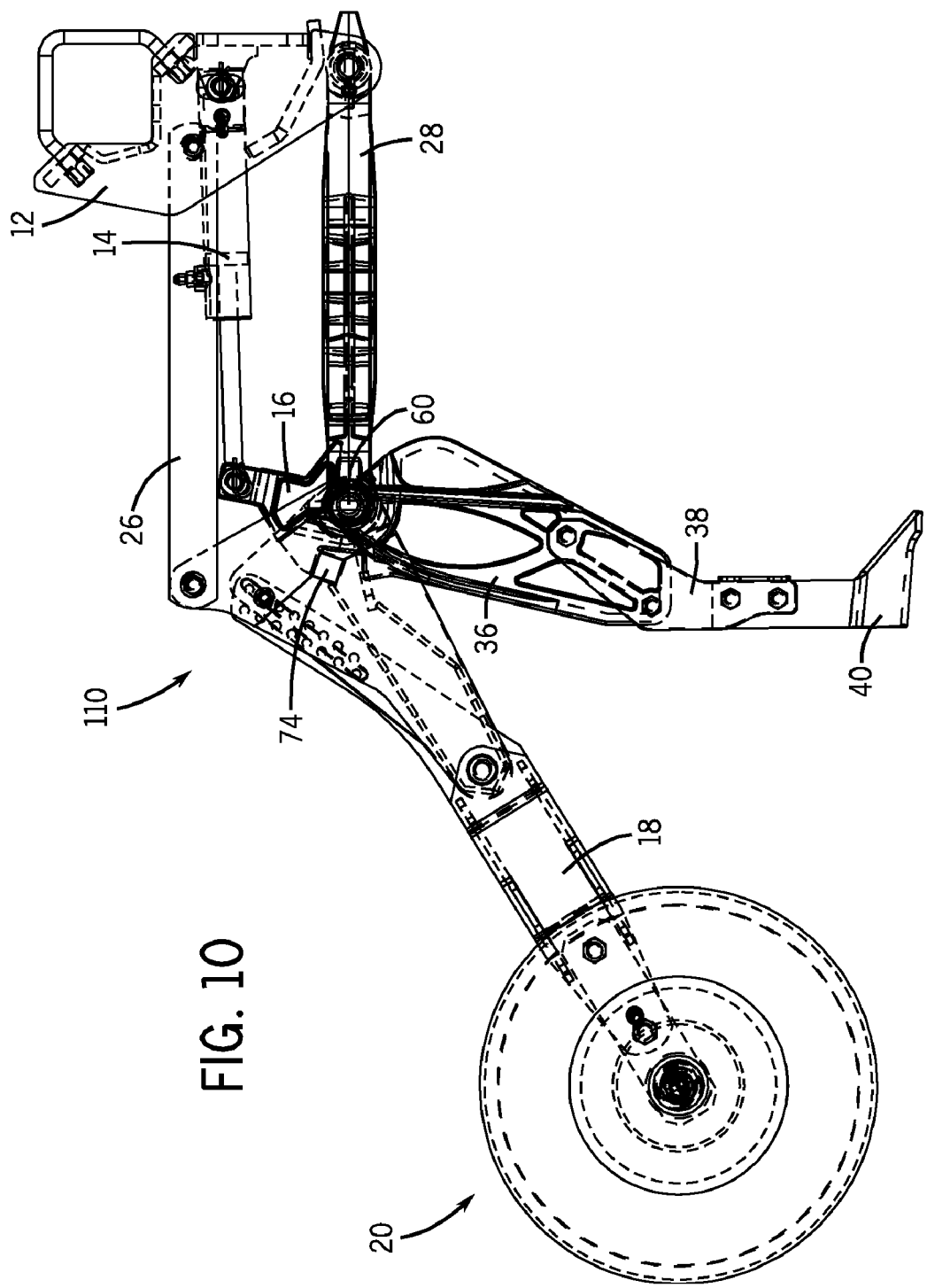
FIG. 10 is a side view of the precision hoe opener of FIG. 9.

FIG. 10 is a side view of the same embodiment of the precision hoe opener 110 featuring a single ground penetrating tool 40, shank 38, and shank mount adapter 36. This figure illustrates the precision hoe opener 110 in the deployed position with ground engaging tool 40 in a position to open the soil, and with packer wheel 20 positioned to pack the opened, seeded terrain. In the illustrated embodiment, cylinder 14 causes swing link assembly 16 to rotate about pin 60 and to engage shank mount adapter 36, and ultimately, once the adapter is sufficiently rotated, rear frame stop 74. When shank mount adapter 36 engages rear frame stop 74, cylinder 14 may exert force on the tool and wheel components through the intermediary of the swing link assembly 16.

Figure 11:
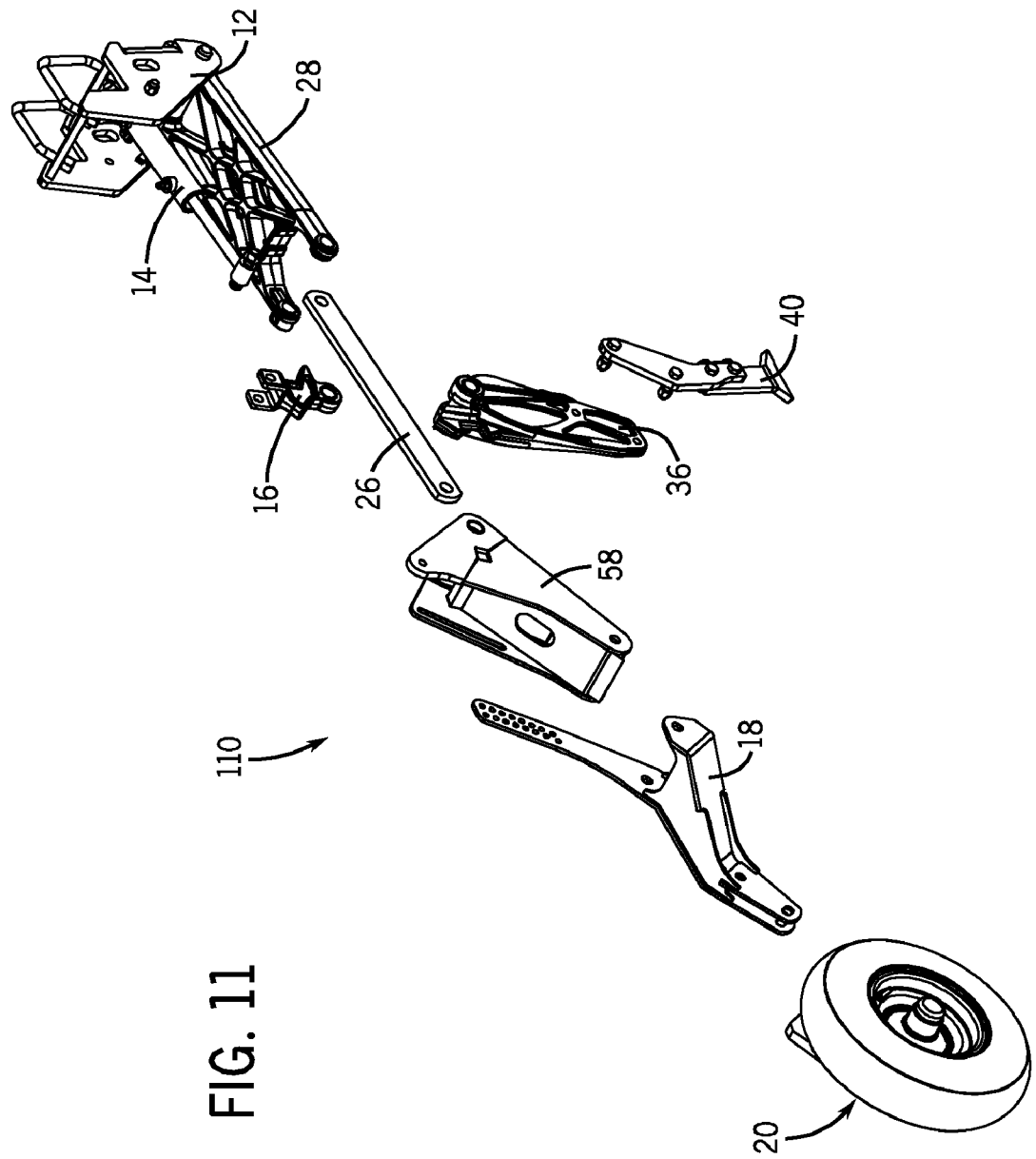
FIG. 11 is an exploded perspective view of an embodiment of the precision hoe opener shown in FIG. 9.

FIG. 11 illustrates an exploded view of this embodiment of the precision hoe opener 110 featuring a single ground penetrating tool 40, shank 38, and shank mount adapter 36. As illustrated, the various components may be made as weldments, as in the case of the presently contemplated configuration of tool frame support 12, rear frame 58 and packer wheel assembly 12, or as castings, as illustrated for swing link assembly 16, member 28 and shank mount adapter 36. Other manufacturing processes and physical configurations may, of course, be envisaged for these or analogous parts. The single ground penetrating tool 40 is bolted to the shank mount adapter 36 in the illustrated embodiment. In the final assembly, one or more conduits may be provided on the single ground penetrating tool to channel seeds, fertilizer and the like to the opening formed by the tool as the implement is advanced across terrain to be seeded.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of manufacturing an agricultural system, the method comprising:
    mounting a ground engaging assembly to extend from a support structure;
    mounting a second ground engaging assembly to extend from the support structure and positioned aft of the first ground engaging assembly along a direction of travel; and
    mounting a lost motion linkage on the support structure, the lost motion linkage being configured to cooperatively contact the support structure to raise the ground engaging assembly after movement of the lost motion linkage through an angular range;
    wherein the support structure includes a shank adapter, the first ground engaging assembly being rigidly mounted to the shank adapter, the lost motion linkage is pivotally mounted to the shank adapter, and the lost motion linkage contacts the shank adapter at two extremities of the angular range.

2. The method of claim 1, comprising mounting a packer wheel assembly extending from the support structure aft of the ground engaging assembly, the packer wheel assembly being raised by contact with the shank adapter.

3. The method of claim 1, comprising coupling a linear actuator coupled to the support structure and to the lost motion linkage, wherein the linear actuator is configured to raise and lower the ground engaging assembly by pivotal movement of the lost motion linkage.

4. The method of claim 1, wherein the support structure includes a parallel linkage for raising and lowering the ground engaging assembly.

* * * * *